United States Patent Office 3,288,646
Patented Nov. 29, 1966

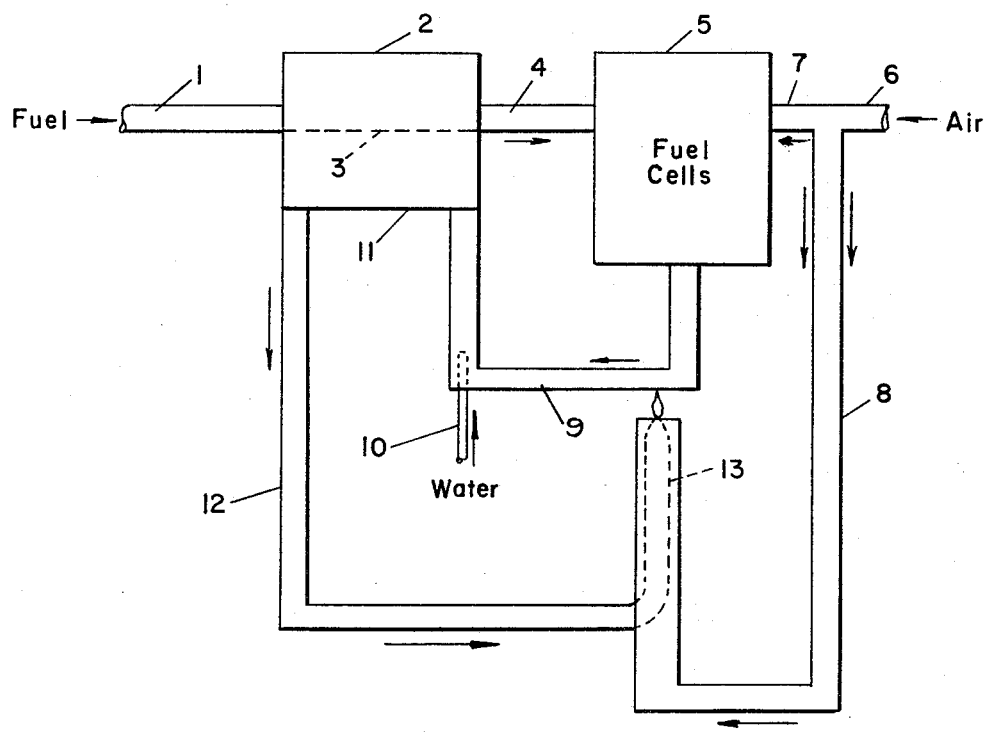

3,288,646
METHOD OF UTILIZING HYDROCARBON AS FUEL IN FUEL CELLS
Sven Gunnar Söredal, Stockholm, Sweden, assignor to Svenska Ackumulator Aktiebolaget Jungner, Stockholm, Sweden, a company of Sweden
Filed July 19, 1962, Ser. No. 210,932
Claims priority, application Sweden, July 21, 1961, 7,516/61, Patent 198,560
6 Claims. (Cl. 136—86)

The present invention relates to a method of utilizing hydrocarbon as fuel in fuel cells. The invention is mainly characterized in that, in the presence of a suitable catalyst hydrogen is mixed into the hydrocarbon, which may be a gaseous hydrocarbon or a vaporized liquid hydrocarbon, possibly a mixture of hydrocarbon vapors, by means of which the hydrocarbons are broken down under the formation of mainly methane, ethane and ethene, the hydrogen being taken from the gases of combustion formed at the operation of the cell.

When fueling high temperature cells with liquid fuel, preferably hydrocarbons, one may mix the fuel with water in the presence of a catalyst for bringing about water gas reaction, in order to avoid the formation of soot. The gas mixture thus obtained contains hydrogen, carbon monoxide, carbon dioxide and water vapor.

In order to get a gas that is stronger reducing, and that will need more oxygen for a complete combustion, one may instead mix the vaporized hydrocarbon with hydrogen at a not too high temperature in the presence of a suitable catalyst. The hydrocarbons will then be broken down under formation of mainly methane, ethane and ethene. This gas is partly burnt in the cell, the gases of combustion containing among other things hydrogen carbon monoxide, carbon dioxide and water vapor.

When operating power plants of different kinds it is of course important that the fuel is utilized at the greatest possible efficiency. One therefore generally sees to it that the fuel is burnt to the highest possible degree. This is, of course, to be aimed at in connection with the operation of fuel cell plants as well. In that connection, however, there is one condition that necessitates an adjustment of the relative degree of combustion in the actual fuel cell, for the output voltage of a fuel cell varies with the degree of combustion. If a fuel cell is operated with varying degree of combustion of the fuel gas, the output voltage will follow a curve that will at the beginning slope somewhat more and then become comparatively flat until the degree of combustion reaches about 60%, and after that the sloping will increase so that the curve will be practically vertical at a degree of combustion of more than 95%. The degree of combustion should, therefore, not be kept at a too high level, as the efficiency of the cell will otherwise be low on account of a low output voltage. If, on the other hand, the cell is operated at a low degree of combustion a low efficiency will be obtained on account of not making sufficient use of the fuel. One thus obtains a curve similar to a parabola with a maximum efficiency at a relative degree of combustion of about 50%. The efficiency will then be much too low, however. There is a method of dissolving the problem described, involving that a fuel gas is first burnt in a first cell to a degree of for instance 40% and then in a second cell, where a further 40% are burnt. The cells are connected in series electrically, and thus the same current is passing both cells. This method has one drawback, namely that the latter cell will operate at a comparatively low voltage, and therefore the cell volume per unit of power will be large. By utilizing the method according to the present invention, however, the fuel gas supplied may be comparatively completely burnt, without necessitating that the degree of combustion of the gas leaving the cell is kept at such a high level as to give rise to any material decrease of the voltage. The method according to the invention has the advantages that the cells will be operated with good fuel economy, and that only a comparatively small cell volume is needed for a certain output voltage.

According to the present invention hydrogen is mixed into the fuel gas in the presence of a suitable catalyst, hydrogen for this reaction being taken from the gases of combustion which are formed at the operation of the cells. The hydrogen content of the gases of combustion may in addition be increased by means of adding a further quantity of water and lowering the temperature in the presence of a catalyst for bringing about water gas reaction. If this gas mixture is led along one side of a wall of hydrogen permeable material, for instance a membrane of palladium, a palladium alloy, nickel or iron, and vaporized hydrocarbon is led along the other side of this wall, the hydrogen will diffuse through the wall from the gases of combustion to the hydrocarbon. After the necessary quantity of hydrogen has been taken away from the gases of combustion and added to the hydrocarbon by this method, the remaining gases of combustion are mixed with air and burnt to heat the cell to a suitable operation temperature.

The drawing schematically shows a device for carrying out the process according to the invention.

The fuel is supplied through tube 1 to container 2 containing a catalyst for the breaking down or hydrocracking of heavy hydrocarbons. A wall 3 in this container consists of a thin membrane of a hydrogen permeable material. The gas is led through tube 4 to a battery of cells 5. Air is supplied through tube 6 which branches off one tube 7 leading to the battery and one tube 8 leading to burner 13 for the combustion of the residual gases. The gases effluent of combustion leave the battery through tube 9, into which tube 10 ends, by means of which water may be added if desired. The gases are thereafter led to container 11 filled with a catalyst for bringing about water gas reaction, one boundary surface of this container being wall 3. Finally, the combustion gases stripped of hydrogen flow through tube 12 to burner 13 keeping battery 5 at a suitable reaction temperature.

In a high temperature plant according to the invention, container 2 is charged with a catalyst consisting of an aluminum silicate, and container 11 with a catalyst consisting of chrome activated iron. These and other catalysts for bringing about the respective reactions are available on the market, however, and well known to those versed in the art. Separating wall 3 consists of a thin palladium membrane. The battery of fuel cells contains 100 cells connected in series each with an electrode surface of 12 dm.$^2$, the positive electrodes of these cells being made of sintered silver powder, and the negative electrodes of sintered iron powder. The electrolyte of the cells consists of a mixture of molten alkali-carbonates and alkali-hydroxides mixed with a sufficiently large quantity of magnesium oxide as to cause the formation of a stiff dough or paste at the operating temperature.

When operating the plant fuel gas in the form of 1 kg. of paraffin oil vapor (kerosene) per hour is supplied through tube 1. This vapor is broken down in container 2 to form a mixture of about 90% methane and 10% hydrogen, 2.2 Nm.$^3$ per hour. This mixture is burnt in battery 5 to which air for the combustion is led at the same time through tube 7. A mixture of 72% air and 28% carbon dioxide is led through tube 6, out of which 19 Nm.$^3$ per hour are led to the battery and 7.6 Nm.$^3$ per hour are led through tube 8 to burner 13 in order to support the combustion there. The combustion in battery 5 will result in gases of combustion with a temperature of about 700° C., consisting of 5.5% hydrogen, 13.5% water, 7.5% carbon monoxide, 25.5% carbon dioxide and 48% nitrogen, 22 Nm.$^3$ per hour. These gases are led through tube 9 to container 11 where they are cooled to about 400° C. and catalytically transformed into a mixture of about 10% hydrogen, 9% water, 3% carbon monoxide, 30% carbon dioxide and 48% nitrogen. A part of the hydrogen will diffuse through palladium membrane 3 and mix into the continuously supplied fuel gas in container 2. The gases of combustion stripped of hydrogen that will eventually flow through tube 12 to burner 13 consist of a mixture of about 3% hydrogen, 8% water, 1% carbon monoxide, 35% carbon dioxide and 53% nitrogen. Under the conditions described, battery 5 will give a current of 120 A. at a voltage of 70 v. The efficiency is about 69%.

If on the other hand a quite similar plant is operated without the addition of hydrogen out of the gases of combustion to the fuel gas the following conditions will be obtained: In order to avoid the formation of soot, water vapor must be added to the fuel. To container 2 there is then supplied a mixture of 1 kg. paraffin oil vapor and 1.7 kg. water vapor per hour. In container 2 there will be a transformation to 67% hydrogen, 4% water, 23% carbon monoxide and 6% carbon dioxide, 7 Nm.$^3$ per hour, which gas mixture is supplied to the battery of fuel cells. The battery will also receive 3 Nm.$^3$ per hour of an air mixture for the combustion consisting of 72% air and 28% carbon dioxide. The gases of combustion, 18.2 Nm.$^3$ per hour, contain 8% hydrogen, 20% water, 6.5% carbon monoxide, 24.5% carbon dioxide and 41% nitrogen. These are brunt in burner 13 together with 13.5 Nm.$^3$ per hour of the air mixture for the combustion. The battery, also in this case consisting of 100 cells, each with an electrode surface of 12 dm.$^2$ and operating at a temperature of 700° C., now delivers a current of 82.6 A. at a voltage of 70 v., i.e. at the same degree of combustion as in the example according to the invention described above. The efficiency is about 48%.

In some cases, the transfer of hydrogen from the gases of combustion to the fuel will not be sufficient when utilizing the arrangement described. In such cases, the transfer may be increased by means of compressing the gases of combustion by means of a pump so as to increase the total gas pressure, and thus the partial pressure of the hydrogen as well, or hydrogen may be evacuated by means of creating an under-pressure on the fuel gas side of the hydrogen permeable membrane. Two different hydrogen separating membranes may further be employed, arranged in cascade and in counter-current. The gases of combustion may then be led to one first "hydrogen separator" and then to a second hydrogen separator, whereas the fuel gas is first led to the second hydrogen separator and hydrogen from the first hydrogen separator is then by means of a pump transferred to the fuel. It is also possible to arrange two or more hydrogen separators and several pumps in other ways, which are obvious to those skilled in the art.

The method according to the present invention may, of course, be combined with the previously known method mentioned, where the fuel is first partly burnt in a first cell and then further burnt in a second cell. In a plant arranged in this manner the first cell is fed with hydrocarbon to which hydrogen out of gases of combustion has been added. The second cell is fed with gases of combustion from the first cell which have been stripped of hydrogen. The gases of combustion obtained from the second cell are stripped of remaining hydrogen and finally burnt for maintaining the operation temperature of the cells. This plant may further be arranged in such a way that hydrogen is transported to the fresh hydrocarbon from the gases of combustion of the second cell by means of a first hydrogen separator and from the gases of combustion of the first cell by means of a second hydrogen separator. By this arrangement, the total hydrogen retransportation may be made very large, and the first cell may in consequence be adjusted to work with a very low degree of combustion, and also the second cell will work with a comparatively low degree of combustion, although the total combustion of the fuel will be very high.

It shall be understood the invention is not limited to the specific arrangements shown, and that changes and modifications may be made within the scope of the appended claims.

What is claimed is:
1. A method of obtaining increased efficiency of utilization of hydrocarbon fuel for a fuel cell generating an electrical output which comprises:
   hydrocracking the hydrocarbon fuel in a cracking zone to produce cracking products,
   introducing said cracking products to the fuel cell for generation of electrical output and of effluent gases of combustion,
   removing said effluent gases from the cell and initiating a water-gas reaction,
   separating hydrogen from the reaction products of said water-gas reaction, and
   supplying said hydrogen to said hydrocracking zone.
2. The method according to claim 1 wherein said hydrocarbon is a gaseous hydrocarbon.
3. The method according to claim 1 wherein said hydrocarbon is vaporized liquid hydrocarbon.
4. The method according to claim 1 where in said hydrocarbon comprises a mixture of hydrocarbon vapors.
5. The method according to claim 1 wherein there is added a further quantity of water vapor during the water gas reaction.
6. The method of claim 1 including the additional steps of
   burning the residual gases of combustion from which hydrogen has previously been separated, and
   utilizing the resultant heat to maintain the temperature of the fuel cell at suitable reaction temperature.

References Cited by the Examiner

UNITED STATES PATENTS

| | | | |
|---|---|---|---|
| 2,271,214 | 1/1942 | Welty | 23—210 |
| 2,384,463 | 9/1945 | Gunn et al. | 136—86 |
| 2,889,273 | 6/1959 | Northcott et al. | 23—212 X |
| 2,901,524 | 8/1959 | Gorin et al. | 136—86 |
| 2,912,478 | 11/1959 | Justi et al. | 136—86 |
| 3,080,442 | 3/1963 | Hobert | 136—86 |
| 3,146,131 | 8/1964 | Linden et al. | 136—86 |
| 3,177,097 | 4/1965 | Beals | 136—86 |
| 3,180,813 | 4/1965 | Wasp et al. | 136—86 X |

WINSTON A. DOUGLAS, *Primary Examiner.*

JOHN R. SPECK, *Examiner.*

H. FEELEY, A. B. CURTIS, *Assistant Examiners.*